Sept. 22, 1959  A. G. SCHRAMM  2,905,345
ELEVATABLE WIDE BED TRAILERS
Filed June 13, 1957  3 Sheets-Sheet 1

INVENTOR.
Arthur G. Schramm
BY Scott L. Nowicl
Atty

Sept. 22, 1959  A. G. SCHRAMM  2,905,345
ELEVATABLE WIDE BED TRAILERS
Filed June 13, 1957  3 Sheets-Sheet 3
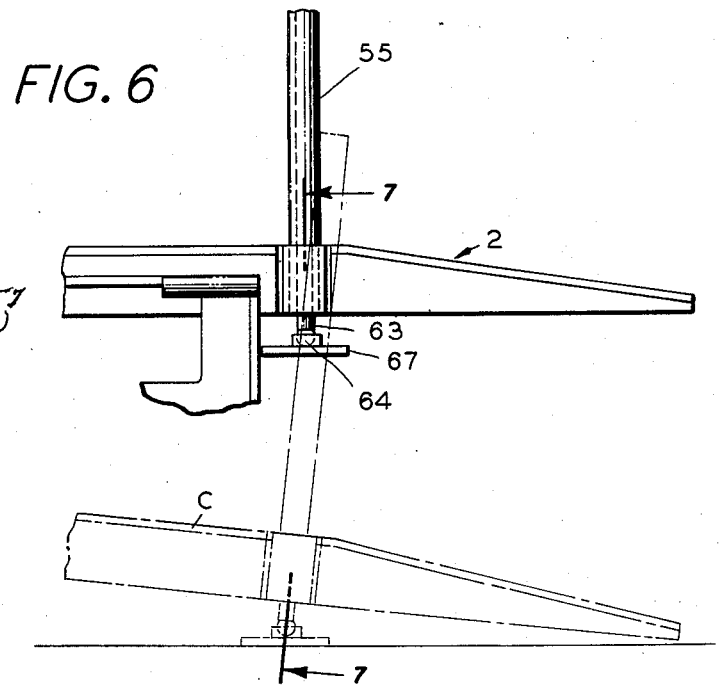
FIG. 6
FIG. 9
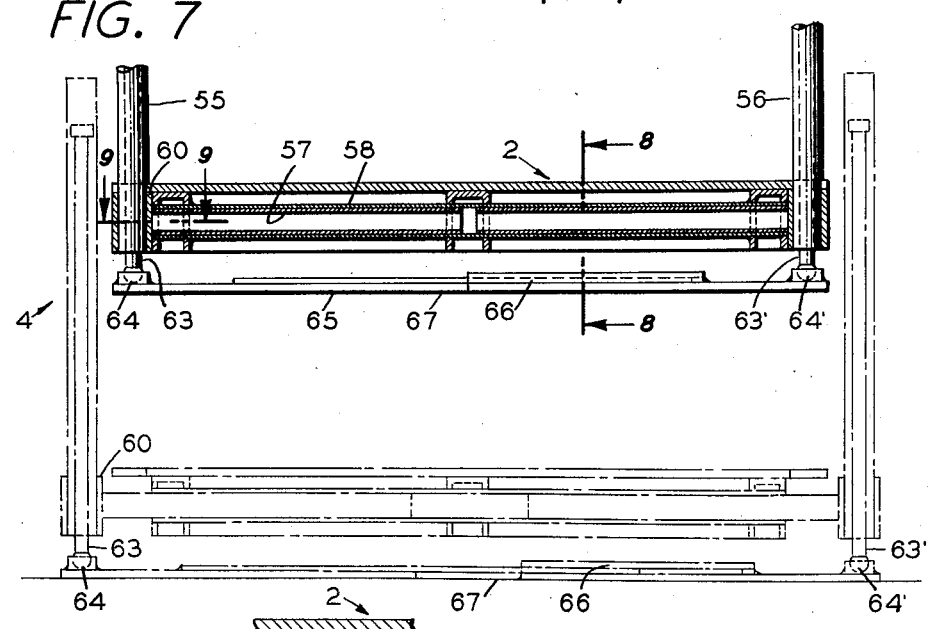
FIG. 7
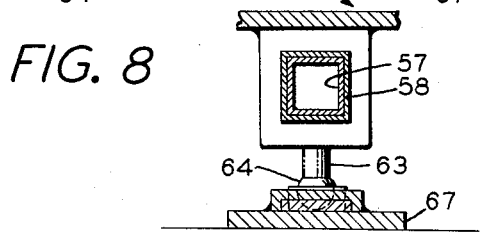
FIG. 8
INVENTOR.
Arthur G. Schramm
BY Scott L. Norvell
atty United States Patent Office
2,905,345
Patented Sept. 22, 1959

2,905,345

ELEVATABLE WIDE BED TRAILERS

Arthur G. Schramm, Phoenix, Ariz.

Application June 13, 1957, Serial No. 665,507

4 Claims. (Cl. 214—505)

This invention pertains to elevatable wide bed trailers.

Heretofore it has been suggested that for the transportation of bulky and heavy machinery and other objects, loading might better be accomplished by lowering the bed of the trailer rather than require the loading and unloading to be done on a ramp. Since it is necessary to employ a bed of maximum legal width it is also necessary to use wheels which travel within the limits of standard treads; therefore, it is desirable that the trailer, or truck as the case may be, run with the wheels beneath the bed, normally, and when it is necessary to lower the bed, that means be provided for moving the wheels and their running accessories and spring suspension out from beneath the bed and thereafter lower the truck bed by means of jacks operating between the truck bed and the ground.

In view of the foregoing, one of the objects of the invention is to provide a wheel suspension for trailers wherein the wheels are spaced according to standard tread widths and are hingedly attached beneath the trailer bed and provided with mechanism for hinging or swinging out from beneath the trailer bed when it is desired to lower the bed for loading purposes;

Another object is to provide a wheel suspension mechanism for trailers, or the like, which include tandem, fore and aft, pairs of wheels on each side of the under part of the trailer bed, sprung and suspended on wheel arms so that each pair of wheels will ride over uneven areas of the road with a minimum of disturbance to the load and may be swung out from under the bed of the trailer by mechanical means when the bed is supported on hydraulic jacks. Still another object is to provide a novel jack lifting means for the bed of the trailer which may be operated by hydraulic means, while the wheels and their attendant springing mechanism are swung out from each side of the bed.

Other objects will appear hereinafter.

I attain the foregoing objects by means of the parts, devices, combinations of parts, and particularly construction shown in the accompanying drawings in which:

Figure 6 is a side elevation of a portion of the bed showing one of the lifting jacks and drawn on an enlarged scale;

Figure 7 is a transverse section of the rear end portion of the trailer bed showing the jack lifting mechanism with the bed shown in section taken substantially on line 7—7 of Figure 6;

Figure 8 is a sectional elevation of the bed and jack mechanism taken on line 8—8 of Figure 7;

Figure 9 is a section of the jack mechanism and a fragment of the bed taken substantially on line 9—9 of Figure 7.

Similar numerals refer to similar parts in the several views.

Figure 1:
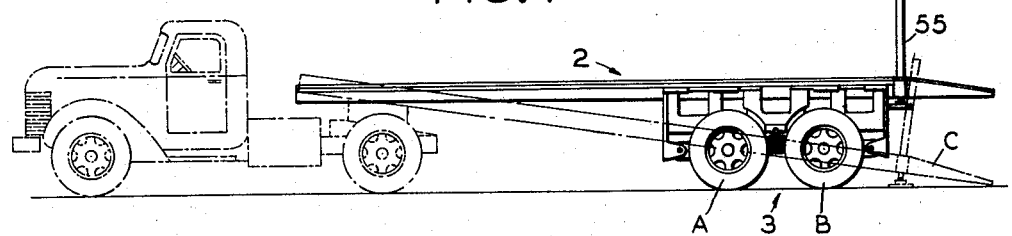
Figure 1 is a side elevational view of a semi-trailer with tandem wheel mechanism incorporating my invention.

Referring to the drawings, numeral 2 indicates the bed of the trailer in general. Numeral 3 indicates the wheel support and springing mechanism in general. This mechanism on the left side is indicated by numeral 3 while the right hand counterpart of this mechanism on the right side is shown by numeral 3′. The jack and bed lifting mechanism is indicated by numeral 4.

Figure 2:
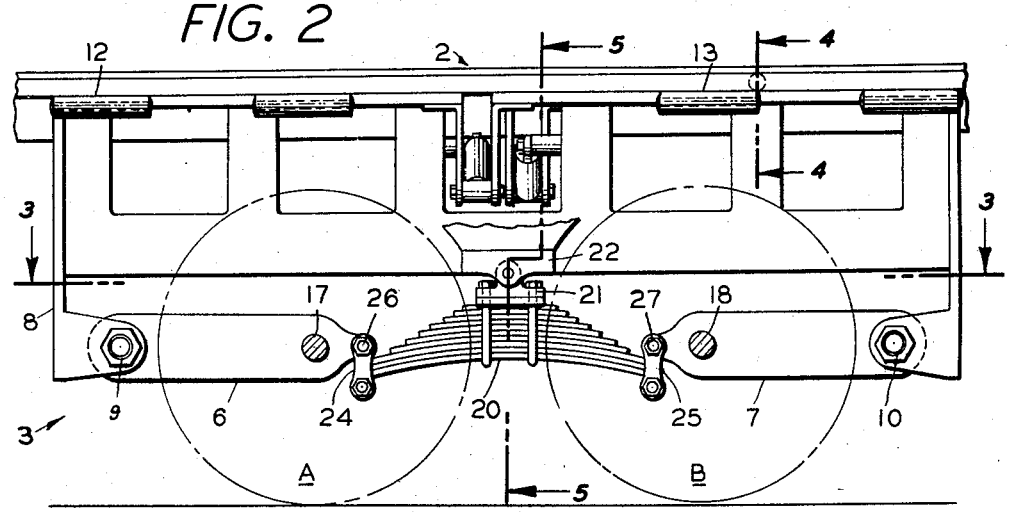
Figure 2 is a side elevational view of one of the wheel suspensions showing mechanism for hinging the mechanism to the under part of the trailer bed.

The wheel supporting mechanism on the left side, shown in Figure 1, consists of wheel arms 6 and 7 which are pivotally attached to a swing-out frame 8 by bolt shafts 9 and 10. The frame 8 is hinged to bed 2 by hinge bearings and sleeves 12 and 13. The frame 8 has a flat portion 14 which bears on the under face of the bed 2 (see Figure 5) and a downwardly depending portion 15. The two parts together give the frame 8 a somewhat L shaped section. The wheels are shown in dotted outline in Figure 2 so that the supporting mechanism will be readily apparent. The wheels are supported on spindles 17 and 18, which are attached to and protrude from the wheel arms 6 and 7. A semi-elliptical spring 20 extends fore and aft relative to the bed and is clamped in its middle and attached to the frame 8 by a pivotal clamp part 21 which is pivotally joined to support parts 22 of frame 8. The point of pivot of the hinge is approximately the fore and aft center of frame 8. Shackles 24 and 25 are attached at the ends of spring 20 and extend upward. At their upper ends they are pivotally joined by pins 26 and 27 to the inner ends of wheel arms 7. By this structure the wheels A and B are sprung by being supported on the spindles 17 and 18 which are pivotally supported to the frame 8 at their outer ends and resiliently supported on spring 20 at their inner ends.

Figure 3:
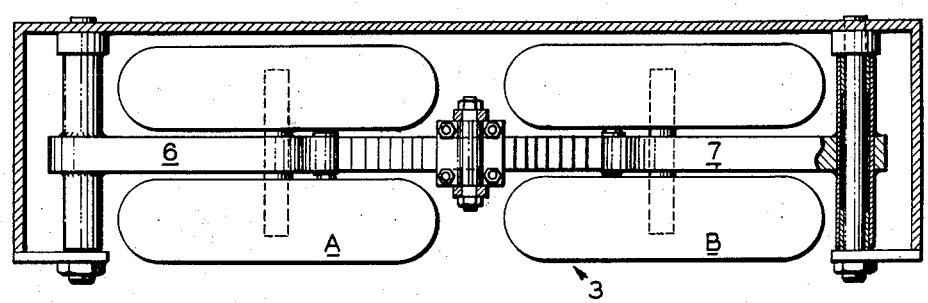
Figure 3 is a horizontal sectional view of the wheel suspension mechanism taken substantially on line 3—3 of Figure 2.
Figure 5:
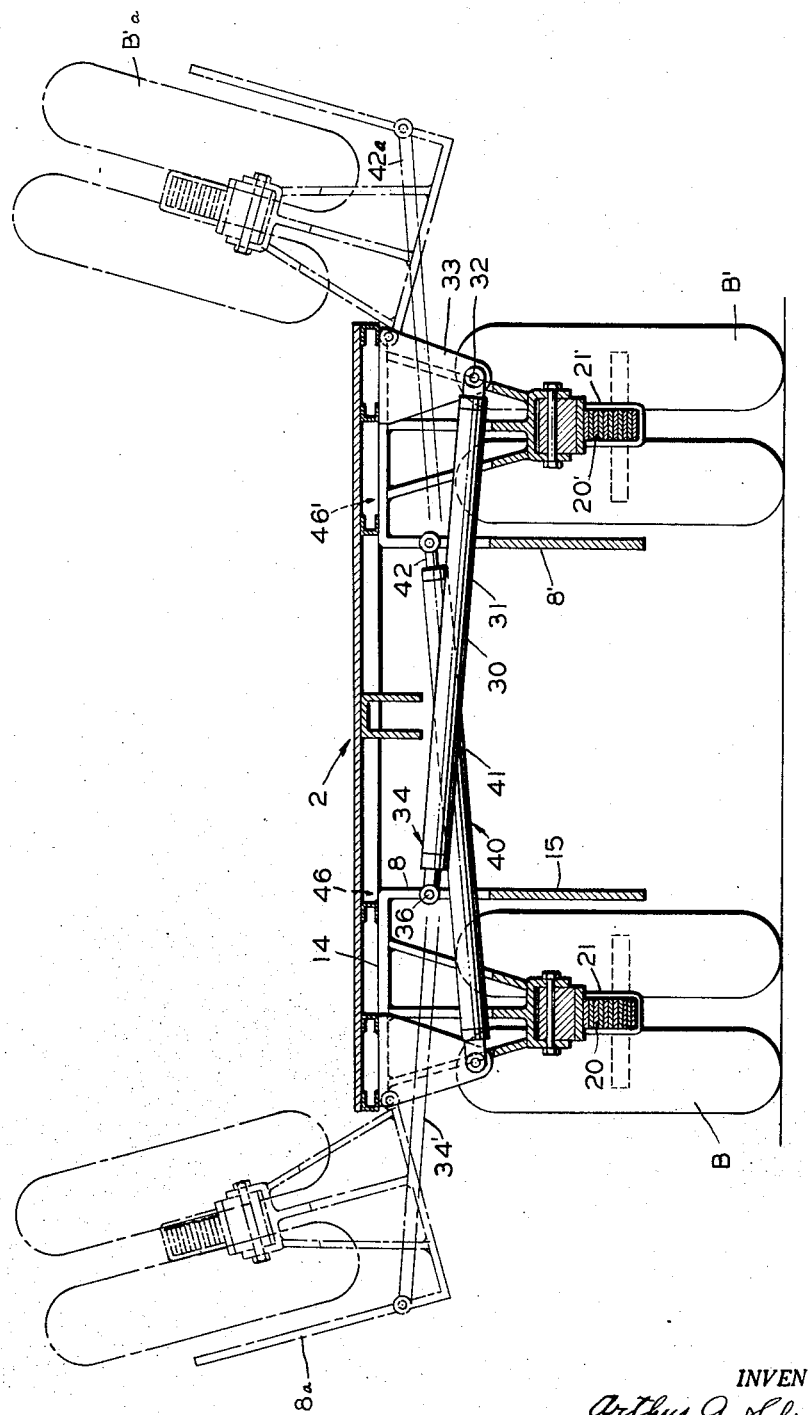
Figure 5 is a transverse vertical section of the wheel suspension mechanism taken substantially on line 5—5 of Figure 2, and with movement of the parts shown in broken lines.

Each of the right and left frames 8 and 8′ is substantially the same in construction except that frame 8′ is the right hand counterpart of frame 8 previously described in detail. Each of these frames is pivotally attached to the under side of the outer edge of bed 2 by the hinges 12 and 13 and 12′ and 13′ as previously described. These frames may be swung out from under the bed by means of hydraulic jacks operating between the bed and the frame. Thus, jack 30 consists of a cylinder 31 pivotally attached by a pin 32 to a drop plate 33 on the right hand side of the bed, as shown in Figure 5. The piston 34, of this jack, is pivotally attached by a pin 36 to the mid portion of frame 8. The jack is shown in contracted position in Figure 5 and its expanded position is indicated in dotted outline. Thus, the piston rod 34′ indicates the extended position of the piston rod and the outline of the frame 8a shows the position of the frame, wheels and wheel suspension in the swung-out position. Whereas I have indicated the wheels A and B as being single wheels it is obvious that dual, such as shown in Figures 3 and 5, are adapted to this type of mechanism. It is therefore to be understood that the fore and aft pairs of tandem wheels on each side are dual tandem wheels, as illustrated and considered.

The right hand frame 8′ is swung outward by means of piston 40 which has cylinder 41 and piston rod 42. The other parts of this arrangement are indicated by dotted outline 42a whereas the wheels on the right side are indicated by A' and B' and their swung-out positions by B'a.

Figure 4:
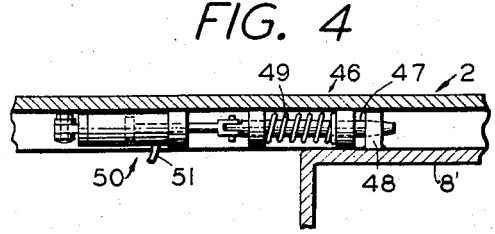
Figure 4 is a vertical sectional view of a fragment of the wheel suspension mechanism showing a power operated latch.

In order to hold the frames 8 and 8' in riding position, as shown in Figure 5, I provide latches 46, one of which is shown in Figure 4. Here it is to be noted that the latch pin 47 operates transversely and engages a tapering hole in the lug 48. This latch pin is held in closed position by spring 49 and is opened by hydraulic ram 50 when hydraulic fluid under pressure is applied through the pipe 51. These latches operate between the bed and the frames 8 and 8' at such positions as may be necessary and advantageous. As a rule, two latches operating on each frame are sufficient.

In order to lift bed 2 so that the weight of the bed and any load upon it may be removed from the wheels, I provide jacks 55 and 56 included in the jacking mechanism 4 and shown particularly in Figures 6 through 9. Each of the jacks is mounted on a tube 57 which is slidable within an outer tube 58. The tube 57 may be said to telescope within the outer tube 58. These tubes have a square section as shown in Figure 8. Normally the jack basing blocks 60 are retracted within notches 61 formed in each side edge of the bed 2. This retracted position is shown in Figure 7 in solid lines. The expanded position is shown in broken lines in the same figure. The lower ends of the pistons 63 of the jacks are provided with ball and socket joints 64 which join them to base plate 65. This base plate is provided with expansible means 66 and provides a side bottom face 67 which contacts the ground as shown in dotted outline in Figure 7, transversely between the jacks. When the jacks are moved out of their notches and hydraulic fluid is supplied to the cylinders 55 and 56 through piping (not shown) the rear portion of bed 2 may be raised from the dotted position shown at C to the raised position shown in solid lines in Figures 1 and 6. Thereafter, the jack, piston rods and the plate 65 may be retracted and lifted from the ground as shown in solid lines, Figures 1 and 6.

I claim:

1. In an elevatable wide bed vehicle, a bed adapted for attachment to a tractive vehicle at its front end and supported by wheeled means at its rear end adapted to lower the bed from a raised running position to a lowered loading position; said means including swing-out longitudinally extending wheel supporting frames, having inverted L shaped sections, laterally disposed beneath the rear portion of said bed with one flat portion of each of said frames being horizontal and bearing on the under face of said bed and its outer edge hinged to the outer edge of said bed, and with the other flat portion of each of said frames depending from the inner edge of said horizontal portion to afford support for wheel supporting mechanism, tandem pairs of dual wheels resiliently mounted and supported on wheel arms pivoted to end portions of the depending portions of said frames and with their free ends extending mutually toward each other, inverted semi-elliptical springs pivotally attached to the under faces of the horizontal portions of said frames and having the spring ends linked by shackles to the free ends of said wheel arms, hydraulically operated mechanism attached beneath said bed for hinging swinging said wheel supporting frames laterally outward from beneath said bed, when said wheels are lifted above the ground, and hydraulically operated jack mechanism at the rear of said bed for lifting said bed so that said wheels are lifted above the ground surface on which they normally rest.

2. In an elevatable wide bed vehicle, a bed adapted for attachment to a tractive vehicle at its front end and supported by wheeled means at its rear end adapted to lower the bed from a raised running position to a lowered loading position; said means including swing-out longitudinally extending wheel supporting frames, having inverted L shaped sections, laterally disposed beneath the rear portion of said bed with one flat portion of each of said frames being horizontal and bearing on the under face of said bed and its outer edge hinged to the outer edge of said bed, and with the other flat portion of each of said frames depending from the inner edge of said horizontal portion to afford support for wheel supporting mechanism, tandem pairs of dual wheels resiliently mounted and supported on wheel arms pivoted to end portions of the depending portions of said frames and with their free ends extending mutually toward each other, inverted semi-elliptical springs pivotally attached to the under faces of the horizontal portions of said frames and having the spring ends linked by shackles to the free ends of said wheel arms, hydraulically operated mechanism attached beneath said bed for hinging swinging said wheel supporting frames laterally outward from beneath said bed when said wheels are lifted above the ground, and hydraulically operated jack mechanism at the rear of said bed for lifting said bed so that said wheels are lifted above the ground surface on which they normally rest; said jack mechanism including vertically disposed hydraulic rams attached to transversely extending telescoping tubular supports on the rear of said bed retractible into notches on the edges of said bed, when not in use, and adapted to be extended laterally from said bed when operated to lift said bed.

3. In an elevatable wide bed vehicle, a bed adapted for attachment to a tractive vehicle at its front end and supported by wheeled means at its rear end adapted to lower the bed from a raised running position to a lowered loading position; said means including swing-out longitudinally extending wheel supporting frames, having inverted L shaped sections, laterally disposed beneath the rear portion of said bed with one flat portion of each of said frames being horizontal and bearing on the under face of said bed and its outer edge portion, hinged to the underside of said bed and disposed with the vertical flat portion of each of said frames providing support for wheel supporting mechanism, wheels mounted on said vertical flat portions of said L shaped wheel supporting frames, motive mechanism operating beneath said bed for hinging said wheel supporting frames outward laterally from beneath said bed when said bed and wheels are lifted above the ground on which the said wheels rest, means for locking and latching said wheel frames in running position, jack mechanism at the rear of said bed for lifting said bed so that said wheels are above the ground on which they normally rest; said jack mechanism including latching means for locking the jacks in raised position.

4. In an elevatable wide bed vehicle, a bed adapted for attachment to a tractive vehicle at its front end and supported by wheeled means at its rear end adapted to lower the bed from a raised running position to a lowered loading position; said means including swing-out longitudinally extending wheel supporting frames, laterally disposed beneath the rear portion of said bed; each of said frames having a flat portion bearing on the under face of said bed and hinged to said bed to swing laterally outward therefrom, riding wheels supported and journalled in said wheel supporting frames; power operated mechanism for swinging said wheels from beneath said bed when said bed is lifted so that said wheels clear the ground; the jack mechanism attached to said bed for lifting and holding said bed at an elevated position so that said wheels are lifted clear of the ground.

References Cited in the file of this patent

UNITED STATES PATENTS

| | | |
|---|---|---|
| 1,857,234 | Buquor | May 10, 1932 |
| 2,018,527 | Kerr | Oct. 22, 1935 |
| 2,641,886 | Graham | June 16, 1953 |
| 2,751,234 | Couse | June 19, 1956 |